United States Patent

Clifford

[15] 3,670,472

[45] June 20, 1972

[54] AUDIO-VISUAL CONCENTRATION DRILL AND PUZZLE PROCESS

[72] Inventor: Daniel Clifford, 7631 Eastlake Terrace, Chicago, Ill. 60626

[22] Filed: May 7, 1970

[21] Appl. No.: 35,355

[52] U.S. Cl. ............................................................. 35/8 A
[51] Int. Cl. .......................................................... G09b 5/04
[58] Field of Search ...................... 35/22 R, 8 A, 35 C, 1, 14

[56] References Cited

FOREIGN PATENTS OR APPLICATIONS 491,948    4/1971    Canada ................................. 35/35 H

OTHER PUBLICATIONS

"Effective Listening" Brochure of the Zerox Corp., page 3.

*Primary Examiner*—Wm. H. Grieb
*Attorney*—Petherbridge, O'Neill & Lindgren

[57] ABSTRACT

A method of inducing concentration of a listener being adaptable for learning or entertainment purposes, the method comprising a producing of a continuing display of audible and apprehensible matter translatable into numbers, letters, or other symbols, and superimposing thereon distracting sounds effective to particularly mask and obscure such matter, the listener being required to transcribe a translation of the matter into an array in a preselected manner which will indicate a level of concentration obtained by the listener.

14 Claims, 3 Drawing Figures

PATENTED JUN 20 1972   3,670,472
FIG.1
FIG.2
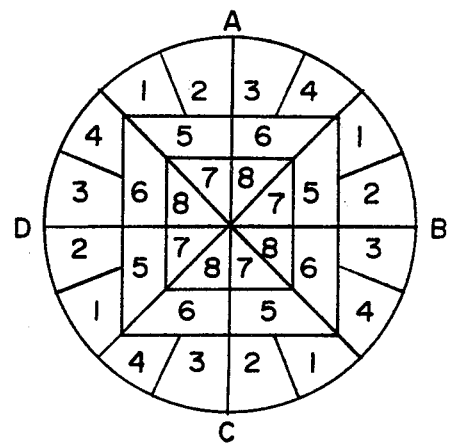
FIG.3
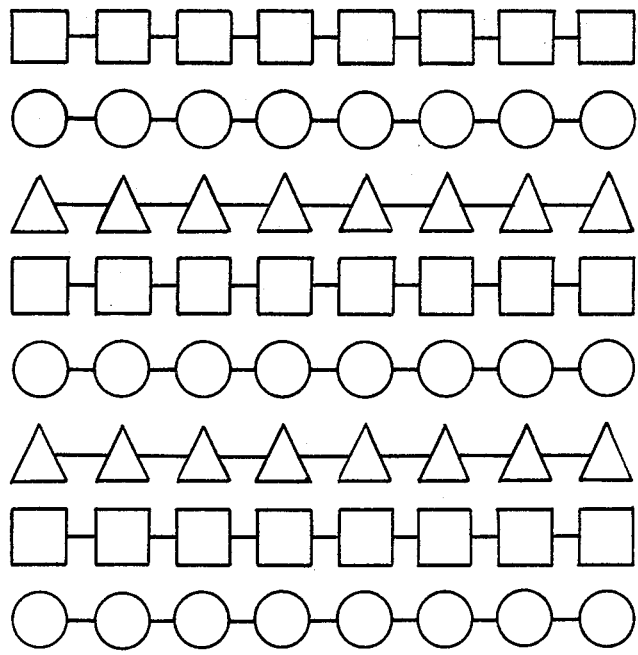
INVENTOR.
DANIEL CLIFFORD
BY Petersbridge, O'Neill & Lindgren
ATTORNEYS.

AUDIO-VISUAL CONCENTRATION DRILL AND PUZZLE PROCESS

Distraction is generally defined as nothing more than paying attention to something that is not a part of the main activity of the moment. When distraction takes place attention shifts involuntarily unless a specific effort is made to concentrate on the chosen activity.

The instant invention is directed toward a method of transmitting audible apprehensible matter in a particular manner which will require a specific concentrative effort by a participant listener in order that the matter be adequately comprehended so it may be translated and then either written down or recorded in a manner which can be scored to thereby determine a level of concentration achieved by the listener. It is apparent that such a method could be easily adapted to games and puzzles for entertainment and/or educational endeavors.

It is contemplated that the instant invention have audio recordings of matter such as instructions and symbols which, by themselves, would be easily understandable by a listener; and superimposing on such matter interfering sounds such as music, tones and beats which will mask and distract and thereby interfere with the reception of receiving intelligence from such matter thereby forcing the listener to focus specifically on what intelligence is being transmitted. It is also comprehended that as the matter is received and understood by the listener it be transcribed in a particular manner which can be evaluated and scored.

More specifically, the foregoing employs a number of simple problems given audibly in a sequence the answers of which are entered as symbols on a prepared array, such as a rectangular arrangement of columns and rows, geometrical figures or arranged designated spaces in a preselected sequence from which levels of concentration can be determined.

The foregoing and other advantages and features of the process will be apparent from the following more particular description of a preferred method of practicing the invention, as partially illustrated in the accompanying drawings wherein:

FIG. 1 illustrates a typical rectangular array of rows and columns;

FIG. 2 is a circular array arranged in quadrants having pecularily designated spaces; and FIG. 3 is a typical array of various geometrically shaped figures arranged in specific patterns.

PREFERRED METHOD

The instant invention relates to a method which utilizes the transmission of apprehensible material to a participant listener in such a manner that a more than normal effort of concentration will be required by him to assure that the content of the material is comprehended. The comprehended material is then simultaneously translated into suitable symbols which are then transcribed into particular patterns which can be scored and the level of concentrative effort of the participant can be evaluated.

The apprehensible material is usually in the form of sounds and/or voices recorded on a sound track of a record or magnetic tape which can be played back at will. The subject matter of the material may be translatable to represent concepts, letters, numbers, words, or meanings. The translatable sounds may include voices giving instructions, simple problems or identification which may also be audibly recorded and used either by themselves or in combination with other non-vocal sounds which are able to be interpreted by the participant. These translatable sounds form an audible foreground on the recording.

Also recorded on either the same sound track or on an adjacent track, for instance as is done on stereo recordings, are sounds such as music, tones and overtones, beats, and the like which are audibly superimposed on the translatable sounds to provide a background sound that interferes and is operative to produce a distracting media, causing the listening participant to shift back and forth between the sounds thereby forcing a focus of attention or concentration on the translatable sound in order that the intelligible matter being disseminated is comprehended and understood.

These interfering sounds are carefully chosen for their masking and distracting affect. Masking sounds are synchronized with the translatable sounds such that tone, intensity and pitch of the interfering sounds are effective to obscure and mask, but will not obliterate the translatable sounds to an extent that they can not be understood, comprehended or subject to interpretation. The level of interference may be varied in proportion with the anticipated difficulty presented by the translatable sounds.

The distracting effect of the interfering sounds are chosen not so much for their masking qualities, but rather for their capacity to entice the participant to be called away from comprehending the translatable sounds because of their unusual sound, beat or melody.

However both the masking and distracting sounds work together on the listener to cause a continual shifting from the foreground (focus) to the background (anti-focus). The listener is continually driven to struggle with the interfering sounds and is thereby forced into induced concentration because of the fact that the interfering sounds are audibly superimposed on the translatable sounds as hereinbefore described.

The method of inducing forced concentration described above uses the focus and anti-focus of the recording to cause and develop listening and reasoning concentration whereby the translatable sounds which represent concepts, letters, numbers, words or meaning, can be translated into numbers, letters or other simple symbols. The translation of the translatable sounds into symbols is then combined with visual means where spacial notions and sequence notions can be used and developed. Therefore, the concentration process may be developed on a spacial basis separate from traditional writing or speech, and abstract symbols and locations can be developed separately from established letters, words and means.

Turning attention to FIGS. 1, 2 and 3, which illustrate typical means for transcribing in a predetermined manner the quantity of intelligence the listener has received and comprehended from the translatable material on the recordings.

Instructions may be given that answers transcribable as numbers, letters or other symbols be recorded by the listener in a selected manner on arrays shown in the Figures. For instance in FIG. 1 the translatable sounds may be disemminate problems in a given sequence which, being translatable into symbols, are placed in order in rows or columns or the squares of the rectangular array of FIG. 1 in a preselected manner. This would consist of a drill which could be easily scored to determine the level of concentration effected by the participant listener.

FIG. 2 may be combined with the concentration process to form location puzzles. Location puzzles consist of individual problems preceded by a location number as disemminated by the translatable sounds on the recording. For example A3 (with problem) followed by B7 (with problem). If a problem is comprehended and solved, a written symbol or other means, such as differently colored discs representing symbols, are placed within the subject location. This process is repeated until all the locations in each quadrant are used. It is apparent that a game having more than one participant, each taking individual quadrants i.e. A,B,C,D, could compete with one another, where the winner would be the one who fills this quadrant first with the proper symbols in the correct locations.

It should also be mentioned that the rectangular array of FIG. 1 could be modified such that a Bingo-type game could be created by blocking off some of the squares and representing the others with location numbers, where each participant would receive his individual and different card. The process as delineated for the location puzzle mentioned above would be employed and the game carried out similar to a typical bingo game except the level of concentration of the participants would be a criteria for winning rather than chance.

FIG. 3 is another form of game where geometric figures are utilized and co-ordinated with the translatable material in order that problems, letters or the like comprehended from the translatable sounds can be translated into predetermined symbols and recorded by the participant in the various geometrical figures in a preselected manner which will be indicative of the concentrative effort made by the participant.

It should be understood that FIGS. 1, 2 and 3 are not to be taken as a total representation of ways in which the novel method hereinbefore described can be utilized. It is apparent that the concentration process can be combined with various visual means of the character delineated above to form numerous drills, games and puzzles which can be used to further educational skills such as the development of concentration and reasoning, and also inducing a learning process which teaches the participant to focus on particular stimulus to the exclusion of similar interfering stimuli. It can also be appreciated that the above mentioned puzzles and games are merely suggestive of the entertainment possibilities of such a combination of the concentration process with arrays of the type which will induce a competitive spirit among the participants to excel in the level of concentration which they can individually achieve.

Therefore the preferred method hereinbefore described is chosen for the purpose of illustration and description herein is that preferred based upon requirements for achieving the inventive concepts of the invention and developing the utility thereof in a desirable manner. It will be understood that the particular aspects delineated are not intended to exclude but rather to suggest such other modifications and adaptations as fall within the spirit and scope of the invention.

What is claimed is:

1. A method of inducing forced concentration and evaluating the level of concentration attained by a participating listener comprising:
   producing audible and translatable sounds having indispersed sounds which are intelligible into concepts, symbols and meanings;
   superimposing upon said translatable sounds in selected synchronization therewith other audible sounds operatively interfering with said translatable sounds to induce a specific concentrative effort by the listener in order that the translatable sounds are understood and comprehended;
   separating the indispersed sounds of the audible and translatable sounds from the other audible sounds at the intervals of occurrence of said indispersed sounds, and
   ascertaining the level of concentration attained by the participating listener through evaluation of the translatable sounds which are comprehended and understood.

2. The method as recited in claim 1 including the step of registering of the comprehended and understood translatable sounds in a preselected manner from which the ascertaining the level of concentration attained by the listener is effected.

3. The method as recited in claim 2 including the step of providing visual means on which the participant listener registers the comprehended and translatable sounds in a predetermined manner from which the ascertaining the level of concentration attained by the listener is effected.

4. The method as recited in claim 3 wherein registering means includes a plurality of identifiable locations each providing a place at which the intelligible symbols and meanings which are comprehended and understood by the listener can be registered.

5. The method as recited in claim 4 wherein the step of producing audible translatable sounds and instructions includes:
   individually identifying the specific locations of said registering means; and
   correlating each of said identified locations with particular translatable sounds wherein the comprehended and understood translatable sounds are registered in their respective locations.

6. A method of producing a process for inducing forced concentration and evaluating the level of concentration attained by a participating listener, comprising:
   recording on a recording medium audible and translatable sounds having indispersed sounds which are intelligible into concepts, symbols and meanings;
   recording on said medium in selective synchronized superimposition upon said translatable sounds other audible sounds operatively interfering with said translatable sounds to induce a concentrative effort by the listener to comprehend and understand the translatable sounds;
   separating the indispersed sounds of the audible and translatable sounds from the other audible sounds at the interval of occurence of said indispersed sounds, and
   providing means for recording by the listener the comprehended and understood translatable sounds in a preselected manner which is determinative of the level of concentration achieved by the listener.

7. The method as recited in claim 6 wherein the recording of said translatable sounds includes interspersing vocal instructions among said translatable sounds.

8. The method as recited in claim 7 wherein the recording in superimposition said other sounds on the translatable sounds includes intermingling sounds having specific masking and distracting affects among said other sounds.

9. The method as recited in claim 6 wherein said means for recording includes visually providing a plurality of identifiable locations each defining a place at which the intelligible symbols and meaning comprehended by the listener can be recorded.

10. The method as recited in claim 9 wherein said means for recording includes arranging said identifiable locations in a rectangular array.

11. The method as recited in claim 9 wherein said means for recording includes forming a plurality of geometric figures each defining one of the identifiable locations, and arranging the figures into geometrical patterns.

12. The method as recited in claim 9 wherein said means for recording includes arranging said identifiable locations in a circular array dividable into segments.

13. The method as recited in claim 9 wherein the step of recording audible translatable sounds includes:
   specifically identifying the identifiable locations; and
   correlating each of said specifically identified locations with particular translatable sounds in order that the comprehended and understood translatable sounds can be recorded in their locations.

14. The method as recited in claim 6 wherein said steps of recording said audible and translatable sounds and recording said other audible sounds are performed on a plurality of recording tracks of said recording medium.

* * * * *